(12) United States Patent
Lee et al.

(10) Patent No.: US 6,794,217 B2
(45) Date of Patent: Sep. 21, 2004

(54) SINGLE CRYSTAL SILICON MICROMIRROR AND ARRAY

(75) Inventors: Seung B. Lee, Ithaca, NY (US); Noel C. MacDonald, Santa Barbara, CA (US)

(73) Assignee: Cornell Research Foundation, Inc., Ithaca, NY (US)

(*) Notice: Subject to any disclaimer, the term of this patent is extended or adjusted under 35 U.S.C. 154(b) by 25 days.

(21) Appl. No.: 10/403,098

(22) Filed: Apr. 1, 2003

(65) Prior Publication Data

US 2003/0203530 A1 Oct. 30, 2003

Related U.S. Application Data

(62) Division of application No. 09/761,860, filed on Jan. 18, 2001, now Pat. No. 6,541,831.
(60) Provisional application No. 60/176,492, filed on Jan. 18, 2000.

(51) Int. Cl.[7] .............................................. H01L 21/00
(52) U.S. Cl. ............................. 438/72; 438/52; 438/50
(58) Field of Search .............................. 438/72, 52, 50, 438/57, 69; 257/415, 431, 417, 420

(56) References Cited

U.S. PATENT DOCUMENTS

| | | | |
|---|---|---|---|
| 5,959,760 A | 9/1999 | Yamada et al. | |
| 6,031,656 A | 2/2000 | Little | |
| 6,075,639 A | 6/2000 | Kino | |
| 6,087,747 A | 7/2000 | Dhuler | |
| 6,198,565 B1 | 3/2001 | Iseki et al. | |
| 6,360,035 B1 * | 3/2002 | Hurst, Jr. et al. | 385/18 |
| 6,449,079 B1 * | 9/2002 | Herrmann | 359/214 |
| 2001/0048784 A1 | 12/2001 | Behim et al. | |
| 2002/0008922 A1 | 1/2002 | Iseki et al. | |

* cited by examiner

Primary Examiner—Caridad Everhart
(74) Attorney, Agent, or Firm—Jones, Tullar & Cooper, P.C.

(57) ABSTRACT

A micromirror is fabricated in a substrate by defining a mirror platform on a first side of the substrate, defining an actuator structure corrected to the platform on a second side of the substrate, and then releasing the mirror platform for motion with the actuator. The actuator may be a comb drive structure having interdigitated movable finger electrodes connected to the mirror platform and stationary finger electrodes mounted on the substrate. The movable and stationary finger electrodes preferably are asymmetrical, and when activated, controllably move the mirror platform either horizontally or vertically with respect to the surface of the substrate.

The comb drive structure may be connected at one of its ends to a torsional support beam secured to the substrate, for torsional motion of the mirror platform with respect to the substrate. Alternatively, the comb drive may be connected at both ends to spaced torsional support beams for vertical motion of the platform with respect to the substrate. In the latter case, the actuator preferably includes spaced hinges to allow expansion of the actuator length.

5 Claims, 12 Drawing Sheets

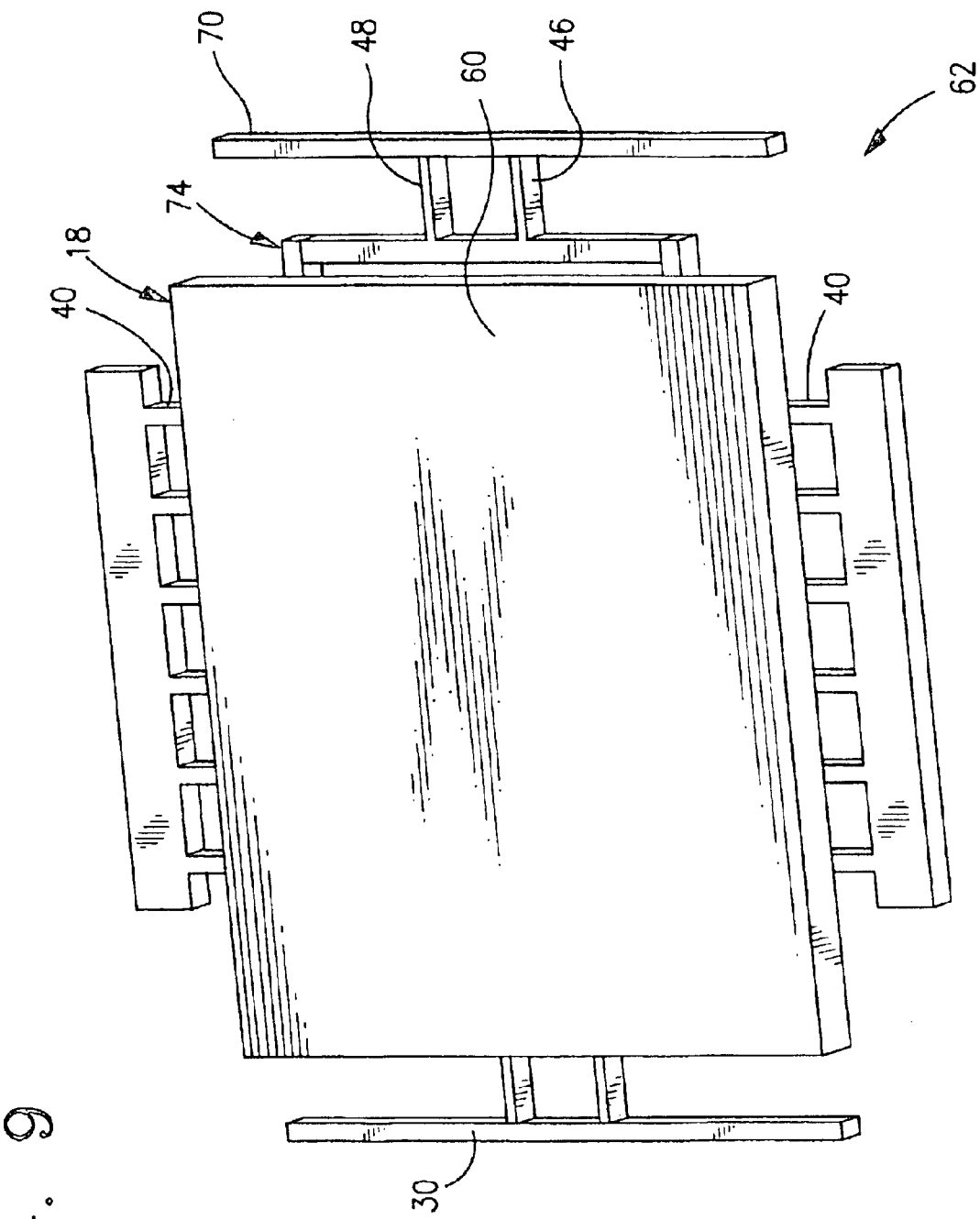

6. Floor Oxide Removal

7. Second Deep
Silicon Etch
—Additional 30 μm

8. SF$_6$ Isotropic Release

9. Third Deep Silicon Etch
—Additional 50 μm

10. PECVD Oxide Deposition
11. Floor Oxide Removal
12. Fourth Deep Silicon Etch
—Additional 20 μm
13. SF$_6$ Release
14. Aluminum Metallization by Sputtering

SINGLE CRYSTAL SILICON MICROMIRROR AND ARRAY

The present application claims the benefit of U.S. Provisional Application No. 60/176,492, filed Jan. 18, 2000, the disclosure of which is hereby incorporated herein by reference, and is a Division of U.S. application Ser. No. 09/761,860, filed Jan. 18, 2001, now U.S. Pat. No. 6,541,831.

This invention was made with Government support under Grant No. DABT 6395CO121 awarded by DARPA. The Government has certain rights in the invention.

FIELD OF THE INVENTION

The present invention relates, in general, to micromirrors and to arrays of such micromirrors, and more particularly to a low voltage, single crystal silicon micromirror assembly having a high fill factor, and to methods of fabricating such micromirrors and arrays.

BACKGROUND OF THE INVENTION

Significant applications of microelectromechanical structures (MEMS) arise from the fact that the fabrication process for such devices allows individual microactuators to be organized into massive arrays which cooperatively perform a macroscopic function. A prominent example of the application of MEMS to such arrays, in which interconnected microactuators are used, are digital projection displays based on digital micromirror devices (DMD). This technology has been used in several applications, including fiber optic crossbar switches, wave front correctors used in adaptive optics and free space communication, optical beam steering, and variable optical gratings. The DMD technology is based on a released polysilicon thin film and metal micromachining process, and on flexible dielectric membrane fabrication using KOH wet silicon chemistry.

Mirror surfaces can be produced on such flexible dielectric membranes, and these have several advantages over conventional piezoelectrically-actuated mirrors. Fabrication is made considerably easier, because no discrete assembly is required, and the actuators for the mirrors can be integrated on the same chip. This process utilizes existing semiconductor fabrication technology to take advantage of batch fabrication processes so that the final cost is low. Performance is enhanced because the system is operated at low voltage and low power. Because the process permits a high actuator density, high spatial resolution is available, and the arrays are lightweight so that high frequency operation is possible.

The biggest drawback of the deformable mirrors produced by this thin film technology is a residual stress in the deposited thin films as well as a stress interaction between the substrate films and reflective mirror films. A polysilicon mirror deformation of 50 nm after the release of the structure has been reported. This produces deviations from the flatness required for a mirror surface, and although it is relatively small compared to the thickness of the mirror and the overall motion of the mirror that can be produced by actuators, such deviations represent significant fractions of the wave length of visible light and, therefore, adversely affect the performance of the mirror. Because of this residual stress problem, the rectangular size of such a mirror is limited to about 200 micrometers or less on each side. To relieve some of this stress, the mirror surface is often fabricated with apertures, which also help in the release process, but the resulting surface of the thin film can be optically rough, although post-deposition treatments can minimize this surface roughness.

Another difficulty with such thin film devices is that they are normally driven by capacitive forces, with the result that motion in the vertical, or z-direction, is based on parallel plate forces. As a result, the deflection of the mirror is not controllable if the motion exceeds about one third of the initial parallel plate gap.

Prior mirror actuators normally include a spring system for motion in response to signals supplied to the capacitor plates, and the design of such spring systems plays an important role in lowering the operating voltages and minimizing actuator area. A variety of spring designs have been developed, some using flexible torsional hinges as the spring system, with the hinges being hidden underneath the mirror structure. Deformable micromirror arrays composed of a flexible polysilicon membrane supported by an underlying array of electrostatic parallel plate actuators can provide extremely high fill factors, in the range of 90%. However, where the thin membrane acts as the spring system for the mirror structure, up to 150 V may be required to achieve a center deflection of 1 $\mu$m, due to the typical geometry of the membrane. Further, the deflection of the membrane may not be uniform, resulting in nonuniform vertical motion across the mirror surface. Tests of arrays using folded flexures attached to the moving mirrors produced an overall effective spring constant in the z-direction that was less than that of the membrane system so that a considerably lower operating voltage was achieved. However, both the flexures and the mirror had to be fabricated in the same layer so that any area taken up by the flexures would directly reduce the area of the array covered by the movable mirror surfaces. Thus, a low fill factor of only about 40% was achieved with this design.

SUMMARY OF THE INVENTION

The foregoing difficulties are overcome, in accordance with the present invention, by a micron-scale, single crystal silicon (SCS) micromirror assembly including a mirror platform having an optical surface, which is optically flat and smooth, free of residual stress, and which is highly reflective after the deposition of a thin metal layer. The assembly also includes a high aspect ratio MEMS actuator structure which supports the mirror platform and produces enhanced manipulation of the optical surfaces.

In accordance with a preferred form of the invention, a suspended, or released, drive actuator is fabricated in one surface of a double polished wafer, with the drive actuator supporting, and being precisely aligned with a corresponding micromirror platform structure fabricated in the opposite surface of the wafer. The polished wafer surface in which the mirror platform is fabricated provides an optically flat mirror surface for receiving a reflective coating such as a thin metal layer, or multiple layer thin films. The mirror assembly is fabricated in the wafer by a suitable process, such as the Single Crystal Reactive Etch And Metallization process (SCREAM) process described and illustrated in U.S. Pat. No. 5,426,070 to Shaw et al, issued Jun. 20, 1995, and is released from the wafer by a through wafer etch. The actuator is connected to the back of the corresponding mirror platform by rigid mounting posts to transfer the motion of the actuator to the mirror.

Micromirror assemblies may be fabricated in arrays of any desired size, utilizing known fabrication techniques, with the individual actuators being operable through individually addressable electrical connections. Routine silicon patterning can be done on the optically flat, SCS mirror surfaces for various optical applications, and scaling up of the arrays may be done.

The actuator which supports the mirror platform preferably utilizes an asymmetric comb finger design having interdigitated stationary and movable fingers having high aspect ratios. Vertical motion of the micromirror assembly with respect to the surface of the substrate is produced by applying a net electric field between adjacent fingers. By providing comb finger electrodes having different heights the range of motion limitations of other parallel plate actuator configurations are avoided.

The MEMS single crystal silicon micromirror platform provided by the present invention has sufficient thickness and rigidity to permit fabrication of features such as optical gratings on the platform and the mirror assembly has an excellent structural rigidity, to provide a uniform motion across the optical surface of each mirror upon operation of its corresponding actuator. By providing an array of mirror platforms on one side of a wafer and providing the corresponding actuators, contact pads, address metal lines and related structural features on the other side of the wafer, a high fill factor can be attained for the mirror array; that is, up to about 90% of the array surface is mirrored, with the remaining portion being taken up by the spaces between adjacent mirrors.

A MEMS micromirror assembly in accordance with the present invention is fabricated in a single crystal silicon (SCS) substrate or wafer using, in one embodiment, a two-mask process. The SCS wafer is polished on its upper and lower surfaces and both surfaces are covered by an oxide layer. If the mirror is to be a reflective metal, for example, the bottom surface is coated with a metal layer such as aluminum, and thereafter a first mask defining a micromirror platform is lithographically defined on the bottom surface. A trench surrounding the platform is etched through the mask, through the aluminum, and partially through the wafer. The mirror surface remains covered by the mask during the succeeding steps, so it is not damaged during formation of the actuator structure and release of the mirror platform.

Thereafter, an actuator, or micromirror drive structure, which may be in the form of a comb type capacitive drive, is fabricated in the top surface of the wafer. In this embodiment, the top surface oxide layer is replaced by a second oxide layer in which is photolithically defined the actuator pattern in careful alignment with the previously formed micromirror platform using a second mask. The actuator pattern is transferred to the silicon wafer by etching, and in accordance with the SCREAM process, the walls of the resulting trenches are covered with a conformal oxide layer. The oxide is removed from the floor of the trenches and an isotropic etch is used to release narrow actuator beam structures. Another conformal oxide layer is applied, the floor oxide is again removed, and the trenches are deepened. Thereafter, another isotropic etch is used to release wider actuator beam structures, and the actuator is metallized to form adjacent capacitive drive electrodes. By selecting the relative widths of the beam structures, released beams of varying heights and aspect ratios can be produced, so that an asymmetric comb-type drive is formed by interdigitated movable and stationary fingers of different heights.

Following formation of the actuator drive structure, the trench in the bottom surface surrounding the mirror platform is etched through the wafer to release the micromirror.

In a second, three-mask embodiment, the actuator is fabricated using second and third masks, following fabrication of the micromirror platform on the bottom of the wafer using a first mask, as described above. In this embodiment, the oxide layer on the top surface of the wafer is patterned through the second mask to define an area where selected portions of the actuator are to be fabricated; for example, where the fixed fingers of a comb-type actuator are to be located. This pattern is transferred to the top surface oxide layer, which is selectively etched to reduce the thickness of the oxide layer. The third mask is then used to define the pattern of the entire actuator structure, and this pattern is transferred into the silicon by the SCREAM process. The structure is then released and metallized, to produce released metallized beams with selected heights, as determined by the thickness of the top surface oxide layer on each beam. Thereafter, the bottom trenches are etched through the wafer to release the micromirror structure, as previously described.

Multiple adjacent micromirrors with corresponding actuators may be fabricated in a single wafer, using the foregoing process, to form an array of MEMS micrometer-scale micromirrors which cooperate to produce a macro-scale mirrored surface. Each micromirror assembly in the array is individually movable and controllable.

The micromirror platform fabricated in the bottom surface of the wafer may be of any desired shape, and thus may be generally rectangular, is relatively thick so as to be sufficiently rigid to maintain optical flatness when the platform is moved by its actuator and to permit fabrication of optical gratings on it, and has dimensions in the micrometer scale. The platform is surrounded by a narrow through-wafer trench and by sufficient space to permit routing of metal connector lines, and these separate the micromirror from a surrounding substrate or, in the case of an array, from adjacent micromirrors. Each micromirror platform is attached to, and supported by, a corresponding controllable actuator structure which is fabricated in the top surface of the wafer and supported by torsion bars or springs.

The actuator, in one form of the invention, includes a backbone structure which may incorporate plural longitudinal, parallel, high aspect ratio beams extending parallel to the length of the micromirror, with multiple transverse beams interconnecting the longitudinal beams in a ladder-like structure.

In one embodiment of the invention, the backbone is connected for pivotal motion about a single high aspect ratio torsion bar which is perpendicular to the backbone, with opposite ends of the torsion bar being anchored to the substrate. In a second embodiment, the backbone is connected to two spaced high aspect ratio torsion bars, with a pair of spaced hinges, each including two stress-relieving bars, being located in the backbone between the torsion bars to divide the backbone into three segments. The outer ends of both torsion bars are anchored to the surrounding substrate to support the backbone in a cavity in the substrate. The two hinges are transverse to, and are coplanar with, the backbone and are generally parallel with the torsion bars. These hinges permit the center segment of the backbone to move uniformly in a z-direction, perpendicular to the plane of the torsion bars and to the plane of the wafer surface, while allowing the two end segments to pivot around their respective torsion bars to permit the out-of-plane motion of the center segment.

Connected to the backbone, and to the middle segment of the backbone in the second embodiment, is a comb-type actuator consisting of multiple movable, high aspect ratio actuator fingers extending perpendicularly from the backbone, and multiple stationary, high aspect ratio fingers mounted on the surrounding substrate and interdigitated with the movable fingers. The individual fingers have high height to width ratio to provide relative stiffness in the vertical direction, and this may have widths on the order of 0.5–3 µm and heights on the order of 5–100 µm or more. Integral with the backbone are vertical support posts which extend downwardly through the wafer, the lower ends of the posts being connected to, and integral with, the mirror platform formed in the bottom surface of the wafer.

The movable actuator fingers connected to the backbone are fabricated as described above to have a different height than that of the interdigitated fixed fingers. Both sets of fingers are metal-coated on their tops and sidewalls to provide actuator electrodes, and the difference in the electrode heights produces a vertical asymmetry in the electric field between the stationary and movable fingers, when a potential difference is applied across the fingers, as described in U.S. Pat. No. 6,000,280, issued Dec. 14, 1999. The asymmetric electric field is mainly due to the difference in the height of the metal covering of the adjacent fingers, in known manner. As described in the aforesaid patent, the asymmetric electric field distribution results in an out-of-plane actuation force that causes the movable fingers, and thus the backbone, to move in a vertical direction upon the application of voltages to the electrodes. In the first embodiment of the invention, where the backbone is connected to a single torsional bar, a voltage across adjacent electrodes produces relative vertical motion of the movable fingers with respect to the stationary fingers, and this causes the cantilevered backbone to pivot about the axis of the torsional bar. This torsional operation is converted into a pure z-direction motion in the second embodiment by connecting both ends of the backbone to torsional bars and incorporating the stress-relieving hinges discussed above, thereby allowing accurate vertical translation of the mirror out of the plane of the bottom surface of the substrate.

In accordance with the invention, the described mirror structures may be fabricated in arrays on a wafer, with any practical number of mirrors being provided.

BRIEF DESCRIPTION OF THE DRAWINGS

The foregoing, and additional objects, features and advantages of the invention will be apparent to those of skill in the art from the following detailed description of preferred embodiments thereof, taken in conjunction with the accompanying drawings in which:

FIG. 9 is a bottom perspective diagrammatic view of a vertical motion micromirror of the type illustrated in FIG. 7;

DESCRIPTION OF PREFERRED EMBODIMENTS

Figure 1:
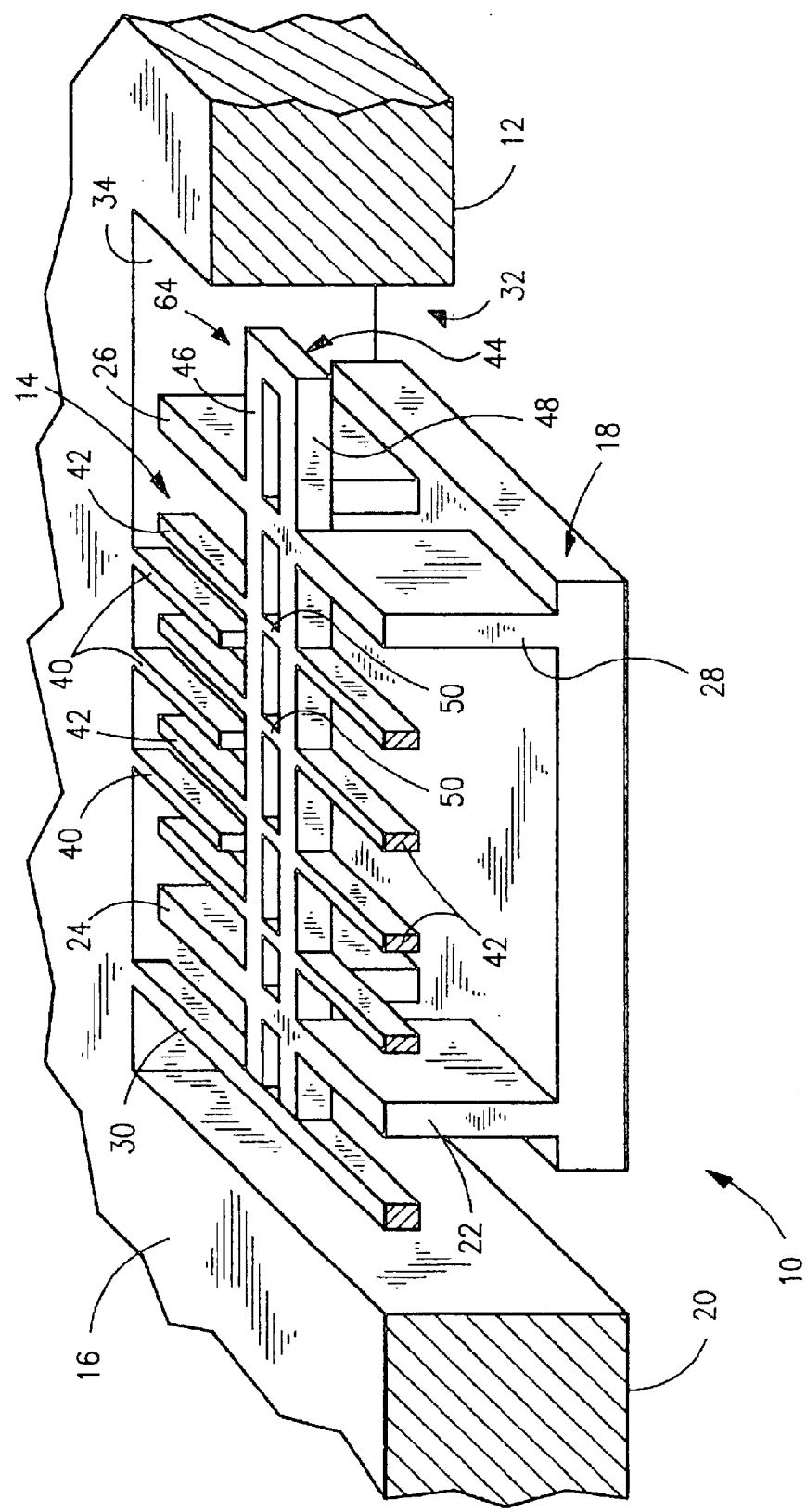
FIG. 1 is a diagrammatic perspective view, in partial section, of a micromirror and actuator assembly constructed in accordance with the present invention.
Figure 2:
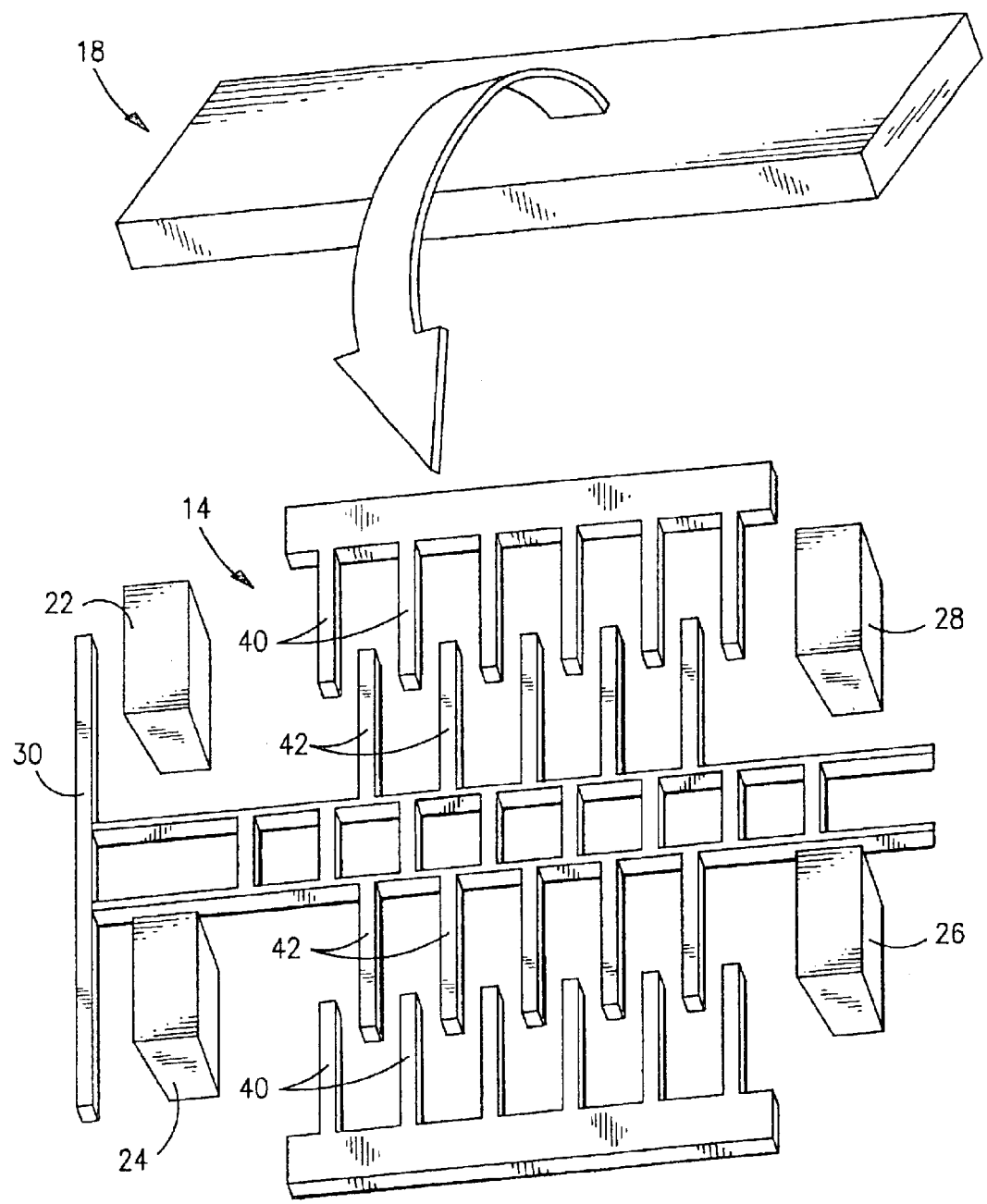
FIG. 2 is an exploded view of the device of FIG. 1.

Turning now to a more detailed description of the present invention, there is illustrated in FIG. 1 a diagrammatic, perspective view of a micromirror structure, or assembly, 10 suspended in a substrate 12, which preferably is a single crystal silicon (SCS) wafer, in accordance with the present invention. The assembly is a microelectromechanical structure (MEMS), preferably fabricated utilizing the known SCREAM process and a through-the-wafer etching process, together with a conventional front-to-back alignment technique. Multiple micromirror assemblies 10 can be fabricated in a single substrate to form a micromirror array, as will be described in greater detail below, but for convenience the structure and fabrication process will be described herein in terms of a single micromirror assembly having a mirror platform suspended from an actuator which, in turn, is suspended within a cavity extending through the SCS substrate. Each micromirror assembly 10 includes an actuator 14 such as a comb-type capacitive actuator fabricated in a first (or top) surface 16 of the double polished substrate 12, and a micromirror platform 18 fabricated in a second (or bottom) surface 20 of the substrate 12. The micromirror platform 18
is connected to the actuator 14 by one or more integral, rigid support posts, four of which are illustrated in FIG. 1 at 22, 24, 26 and 28.

Figure 3:
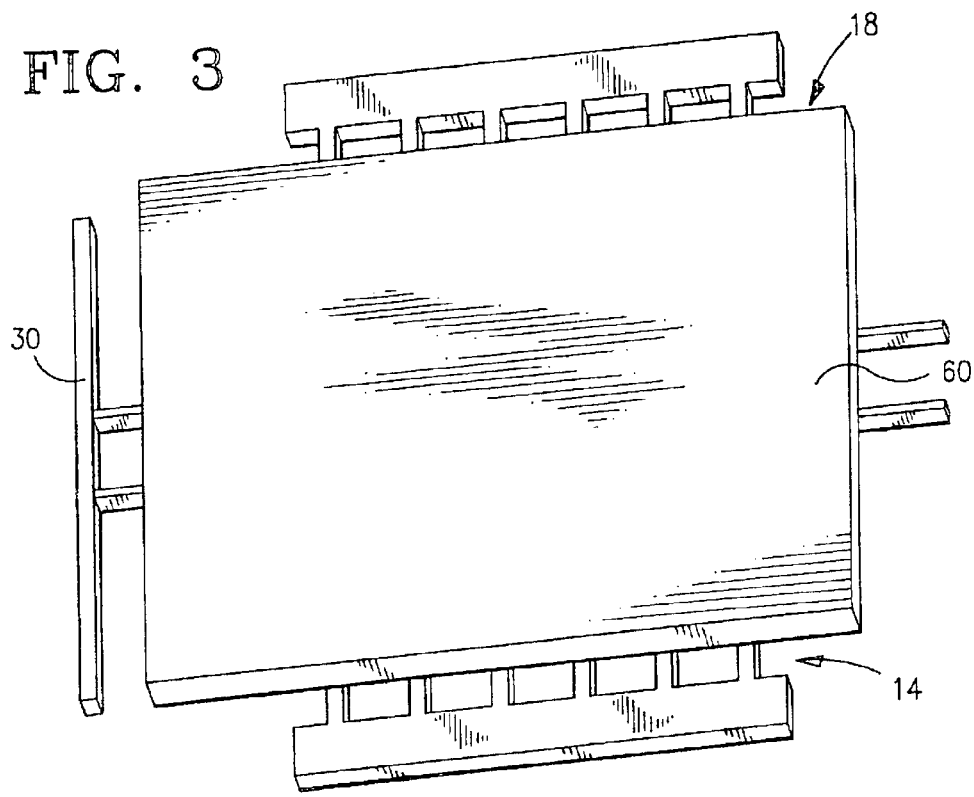
FIG. 3 is a bottom perspective view of the micromirror structure of FIG. 1.
Figure 4:
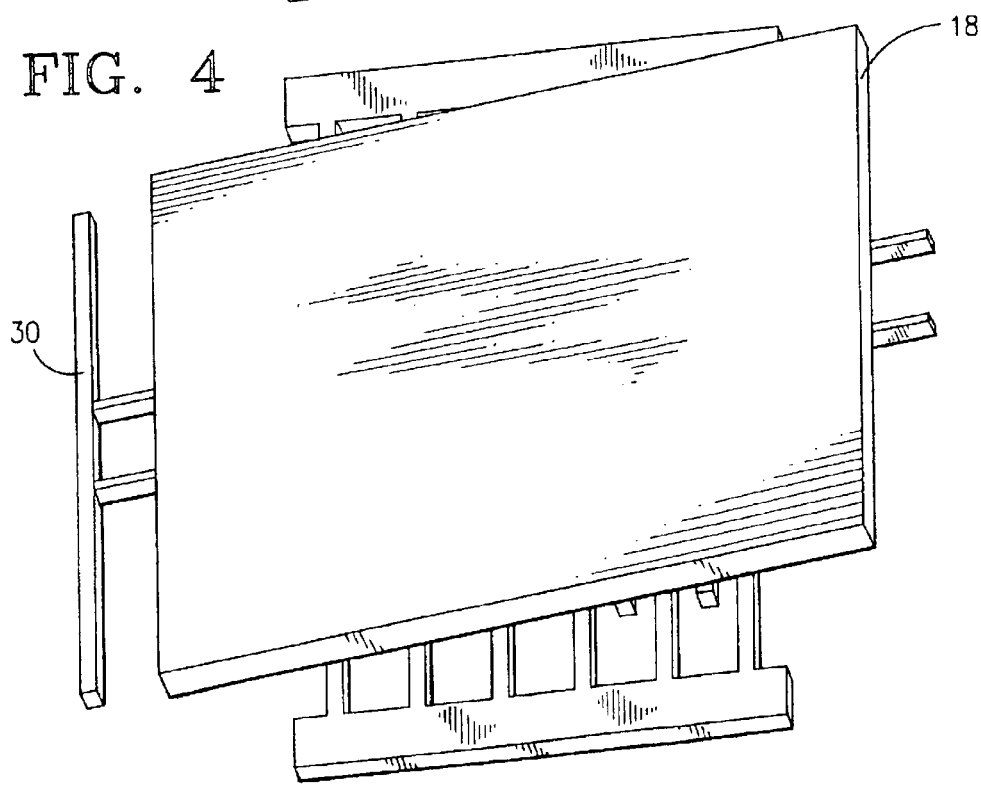
FIG. 4 is a bottom perspective view of the micromirror device of FIG. 1 illustrating its torsional motion.

In the illustrated embodiment, the micromirror assembly 10 includes a movable portion which is supported at one end by means of a torsional beam, or spring, 30 in cantilever fashion for pivotal motion about beam 30 within a cavity 32 formed in the substrate. The beam 30 extends across the cavity 32 and is secured at opposite ends to the cavity sidewall 34. The pivotal motion of the micromirror assembly 10 is illustrated in FIGS. 3 and 4, and is produced by the application of a suitable voltage across stationary fingers 40, mounted on the sidewall 34, and interdigitated movable fingers 42, mounted on the movable portion of the assembly, which form the comb-type capacitive actuator 14.

In a preferred form of the invention, the movable portion of actuator 14 includes a horizontal backbone 44 parallel to the top surface of the substrate and including two parallel beams 46 and 48, the beams being held in spaced apart relation by transverse cross bars 50. The beams 46 and 48 have high aspect ratios; that is, the height of each beam is greater than its width to produce stiffness in the vertical direction. The support posts 22, 24, 26 and 28 are secured to or are integrally formed with the backbone and extend through the wafer to the platform 18. The movable fingers 42 extend outwardly from, and are coplanar with, the backbone 44 and also have high aspect ratios for stiffness in the vertical direction.

In a preferred fabrication process, the micromirror platform 18 is formed in the bottom surface of the substrate. Then the actuator is fabricated in the top surface and is released for motion with respect to the substrate, utilizing the SCREAM process, with the actuator being precisely aligned with the micromirror platform using a front to back aligner. Thereafter, the micromirror platform is released from the substrate by a through wafer etch from the bottom surface of the substrate. In the fabrication process, the movable and stationary fingers 40 and 42 are electrically insulated and then are coated with an aluminum layer to provide electrically conductive layers on opposed finger surfaces. The silicon cores of the fingers and beams are connected to each other, but the metal layers are physically separated and electrically isolated from the silicon by a sidewall PECVD oxide, as known in the SCREAM process, to provide opposed, spaced electrodes on adjacent fingers.

Figure 5:
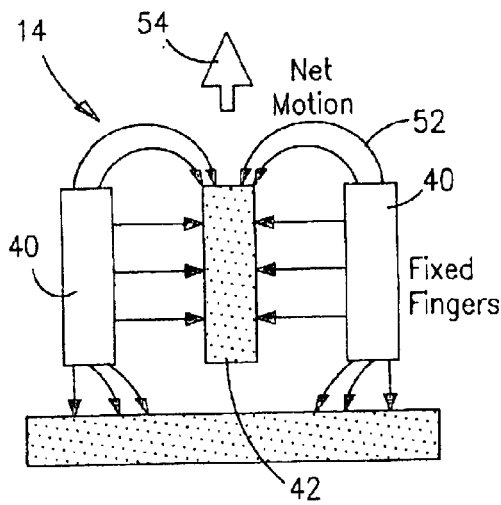
FIGS. 5 and 6 are diagrammatic illustrations of electrostatic forces producing out-of-plane motion in mirror actuators.

As described in the aforesaid U.S. Pat. No. 6,000,280, and illustrated in FIG. 5, upon application of a suitable potential difference across adjacent movable and stationary finger electrodes, an electrostatic field 52 is produced between the adjacent fingers to produce a vertical force, illustrated by a row 54 in FIG. 5. This vertical force causes the movable fingers to move away from the stationary fingers, causing the micromirror assembly 10 to pivot about torsional beam 30, as illustrated in FIGS. 3 and 4.

Figure 6:
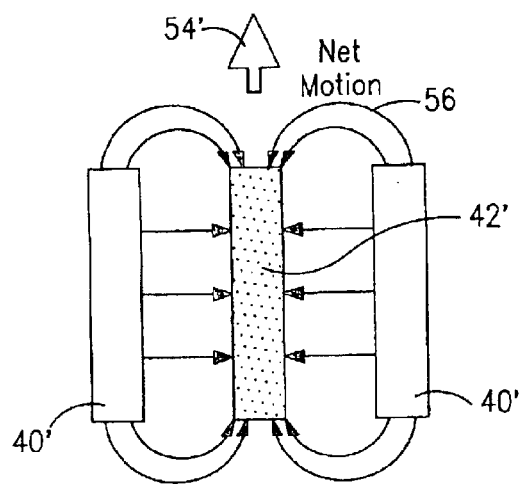

Although the fingers 40 and 42 may be fabricated with the same height, in a preferred form of the invention the fixed and movable fingers have different effective heights, and thus different height electrodes, as illustrated by fingers 40' and 42' in FIG. 6, to obtain asymmetric electric fields, such as the fields 56. In one embodiment of the invention, the fixed fingers 40' have a height that is approximately 0.3 $\mu$m greater than the height of the movable fingers 42'. This difference in the effective heights of adjacent electrodes produces a greater net vertical force 54', thereby increasing the vertical motion of the movable structure. This motion is controllable by varying the applied voltage, allowing the total amount of out-of-plane deflection of the micromirror platform 18 to be controlled within its operating range.

The micromirror 10 preferably is of micrometer scale, and its dimensions can vary widely. For example, the backbone 44, the torsional bar 30, and the fixed and movable fingers 40 and 42 may have widths between about 0.5 $\mu$m and 3 $\mu$m, heights of about 5 $\mu$m to 1000 $\mu$m, with a spacing between adjacent fingers of about 2 $\mu$m to 4 $\mu$m. The thickness of the mirror platform 18 can range from 10 $\mu$m to 100 $\mu$m, with a mirror surface, such as the surface 60 illustrated in FIG. 3, of approximately 320 $\mu$m×170 $\mu$m in one version of an experimental structure configured in accordance with the invention. In this experimental structure, the size of the integral actuator 14 was approximately 382 $\mu$m×250 $\mu$m. Preferably, the mirror platform 60 is coated with a thin layer of reflective aluminum film to produce the desired reflectivity, with the thickness of the platform being sufficient to maintain a smooth, flat surface even during motion of the micromirror 10.

Figure 7:
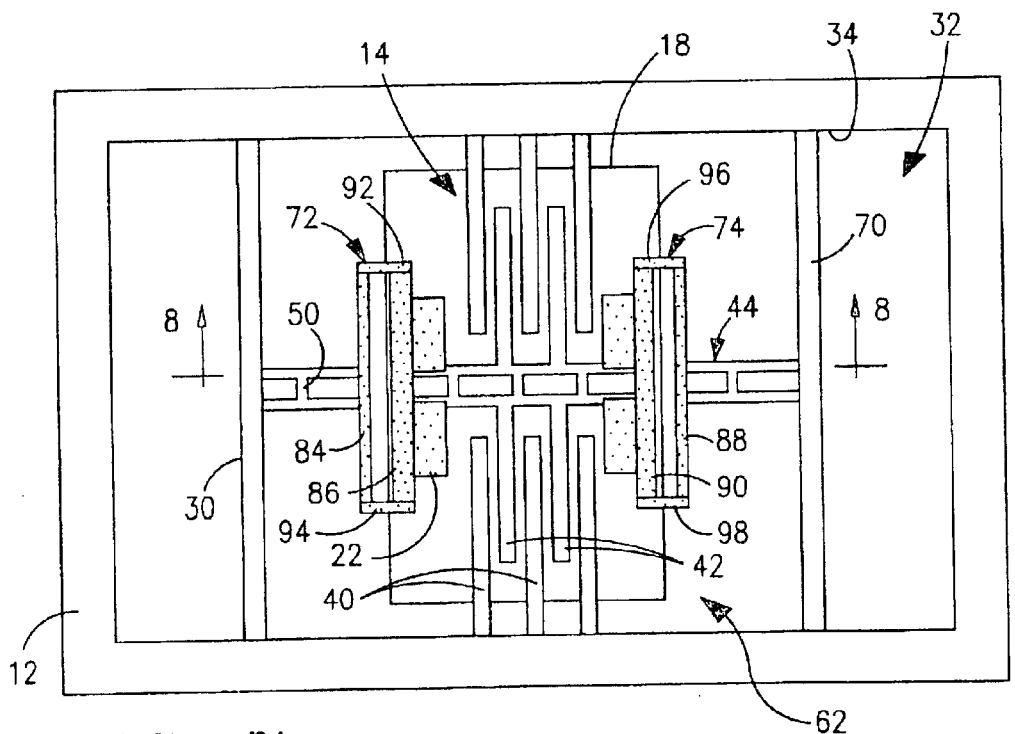
FIG. 7 is a diagrammatic top plan view of a second embodiment of a micromirror actuator assembly producing vertical, or z-direction, motion utilizing the actuators of FIGS. 5 and 6.
Figure 8:
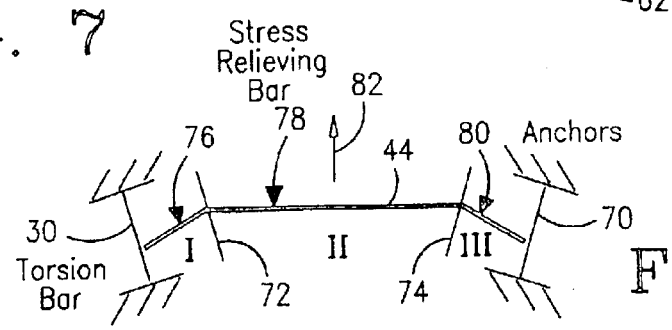
FIG. 8 is a diagrammatic cross-sectional view of the device of FIG. 7, taken along lines 8—8 and illustrating the z-direction motion of the device of FIG. 7.
Figure 7A:
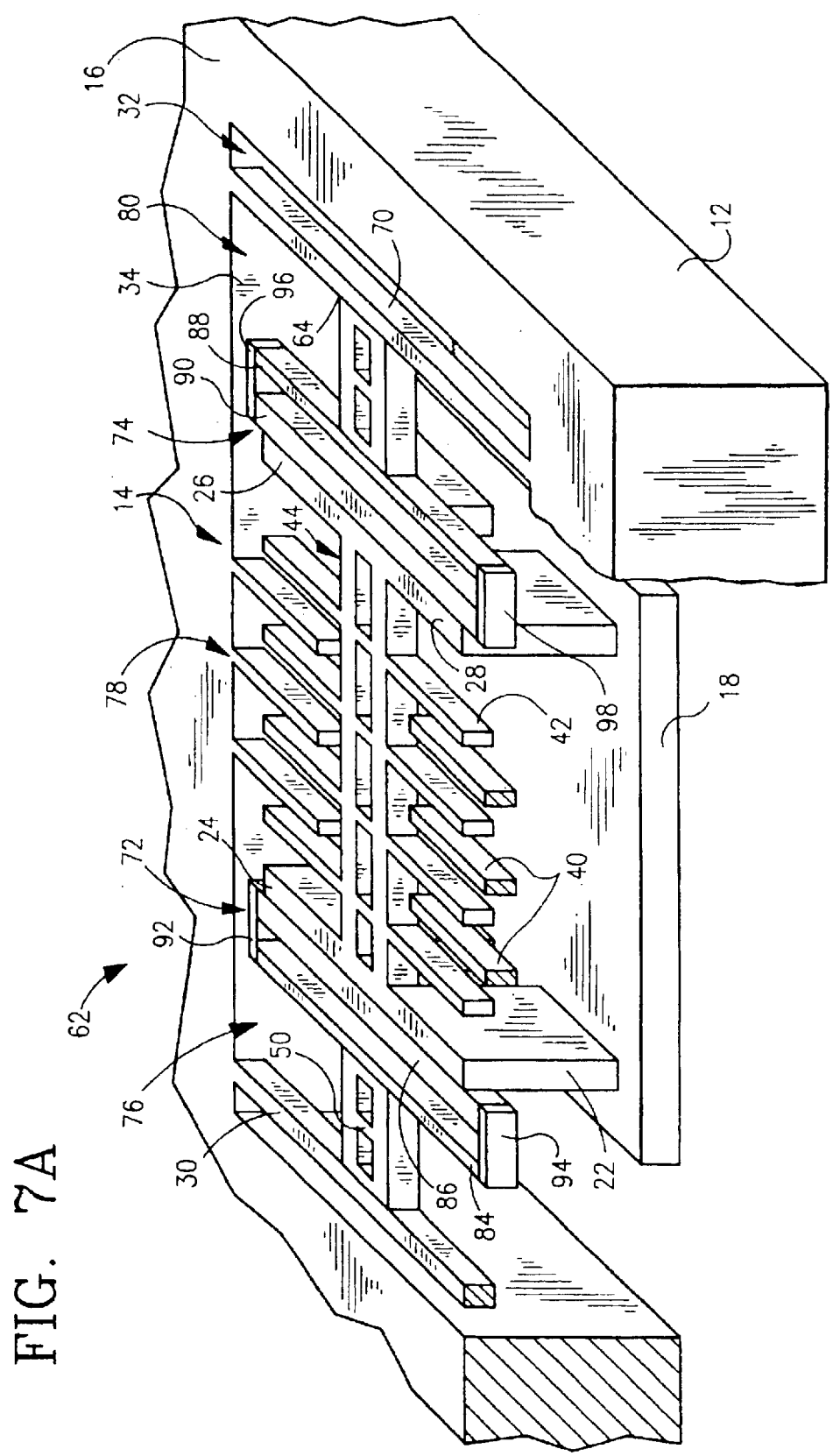
FIG. 7A is a diagrammatic top perspective view of the actuator assembly of FIG. 7.

In a second embodiment of the invention, the torsional motion micromirror assembly 10 illustrated ill FIGS. 1–4, is converted to a vertical-motion micromirror 62, as illustrated in FIGS. 7–9, wherein elements common to the structure of FIG. 1 are similarly numbered. In this embodiment, the free end 64 of the backbone 44 (FIG. 1) is connected to a second torsional beam, or support spring 70. As illustrated, torsion beam 70 extends across cavity 32 in the substrate 12 and is secured at opposite ends to wall 34. Z-direction motion, or vertical motion perpendicular to the plane of the actuator 14, is obtained in this embodiment by providing in the backbone 44 two stress-relieving hinges 72 and 74 spaced apart to divide the backbone into three segments, generally indicated at 76, 78 and 80 in FIGS. 7A and 8. The hinges allow backbone segments 76 and 80 to pivot about respective torsion bars 30 and 70 and allow expansion of the length of the backbone when the application of a suitable voltage across the interdigitated fingers urges the central segment 78 to move vertically, in the direction of arrow 82 in FIG. 8. To accommodate the required expansion of the length of backbone 44 during vertical (z-direction) motion of segment 78, each hinge incorporates a pair of spaced, parallel, high aspect ratio bars, illustrated at 84 and 86 for hinge 72 and at 88 and 90 for hinge 74. Bars 84 and 86 are perpendicular to, and lie in the plane of, backbone 44 and are connected to each other at opposite ends by respective connector beams 92 and 94. Similarly, bars 88 and 90 for hinge 74 are parallel to each other, lie in the plane of backbone 44, and are interconnected at their ends by bars 96 and 98.

The widths of inner hinge bars 86 and 90 are greater than the widths of the corresponding outer hinge bars 84 and 88 so that the inner bars 86 and 90 do not bend or twist when the actuator moves the segment 78 of the structure vertically. Inner bars 86 and 90 and end bars 92, 94 and 96, 98 sized to be rigid to provide vertical motion of the mirror platform 18 and to keep the platform planar. The outer bars 84 and 88, on the other hand are thinner and will twist and bend as required to accommodate expansion of the length of the backbone during the vertical motion of the central segment 78. Lateral motion of the mirror platform and the actuator 14 is eliminated by the symmetry of the hinges 72 and 74 and the torsion beams 30 and 70.

Figure 10:
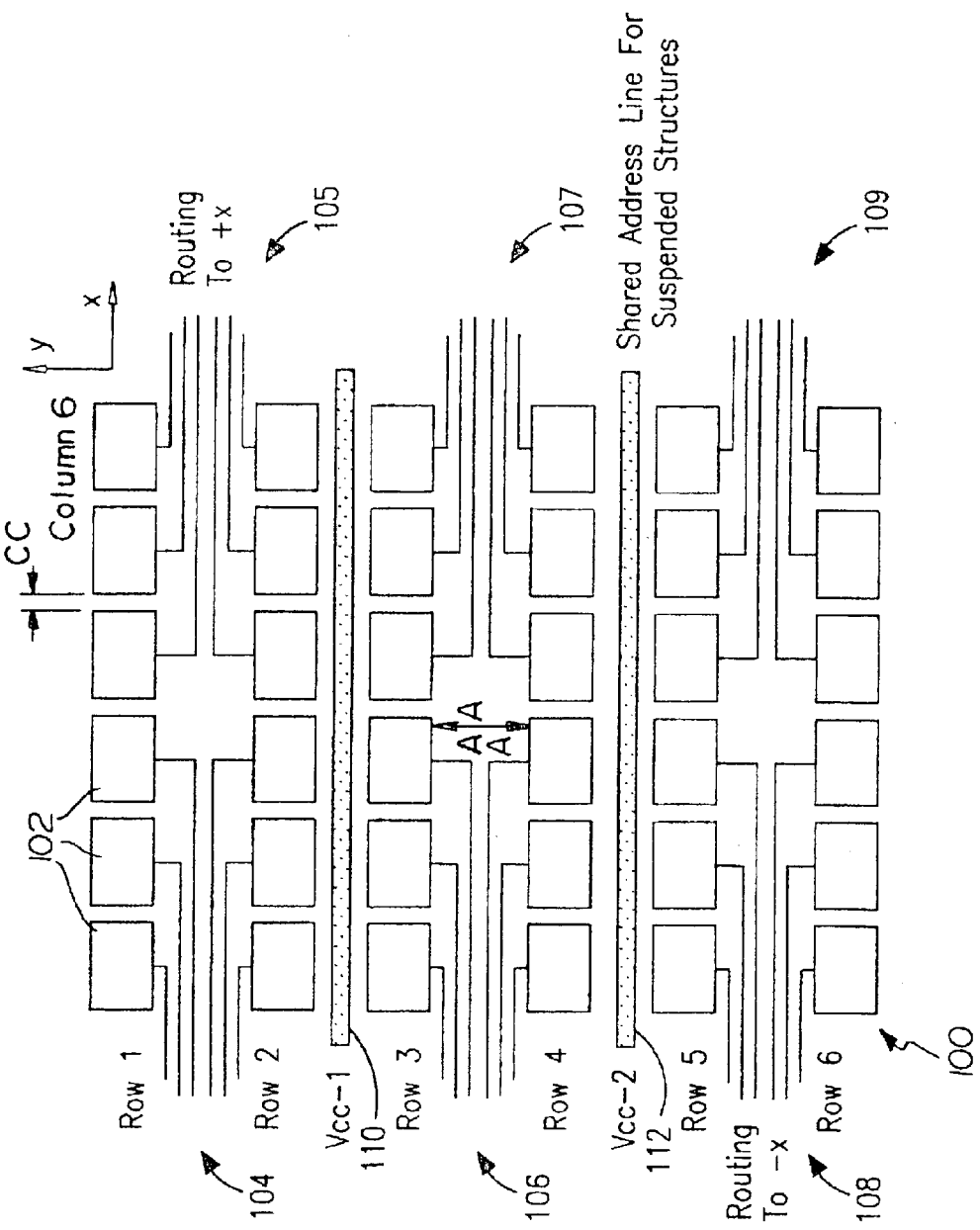
FIG. 10 is a schematic illustration of a 6×6 array of micromirrors, illustrating address line routing.

As previously indicated, a large number of the micromirror assemblies 10 or 62 may be fabricated on a single substrate and interconnected to form a large array of single crystal silicon micromirrors, as diagrammatically illustrated in FIG. 10. In this figure, a 6×6 micromirror array is illustrated; however, it will be understood that other configurations may be utilized, taking into account the need for providing electrical connections to each actuator, the need to electrically isolate the elements, and the need to provide adequate coverage of the array by the reflective mirror surfaces 60 in order to provide a sufficiently high mirror fill factor. As the array becomes larger, a greater number of interconnects must be routed between each array element, and this requires that a significant amount of space must be left between adjacent mirrors for the address lines.

The array 100 is made up of micromirror structures 102, which may be either the pivotal motion micromirror assemblies 10 of FIGS. 1–4 or the vertical motion micromirror assemblies 62 illustrated in FIGS. 7–9. Address lines generally indicated at 104 are provided for the micromirror structures in known manner, with electrical connections to the devices being made using contact pads formed on the surrounding substrate. For an n×n array, 2 $n^2$ address lines are needed, with two electrical connections being provided to each actuator. As illustrated in FIG. 10, for example, the suspended structures; the is, the movable fingers, in rows 2 and 3 share common address lines so that the electrical connection to the suspended structures in these rows is by way of address line 110. Similarly, the suspended structures in rows 4 and 5 are electrically connected to line 112. Each actuator then has a unique electrical connection for the fixed portions of the actuator structures; that is, for the fixed fingers. Thus, the fixed structure address lines for the actuators in rows 1 and 2 are routed parallel to each other, as indicated at 104 aid 105; the address lines for the fixed structures of rows 3 and 4 are parallel to each other, as indicated at 106 and 107, and the fixed structure address lines for the actuators in rows 5 and 6 are parallel to each other, as indicated at 108 and 109. The lines from the first 3 columns are routed in the negative x-direction, while the lines from the other 3 columns are routed in the positive x-direction.

The spacing between the adjacent rows, indicated by the arrow AA, which is the spacing between rows 3 and 4, for example, is largely determined by the number of required address lines. Accordingly, the two-direction routing illustrated in FIG. 10 reduces the required spacing and improves the mirror fill factor. It should be noted that the lines 110 and 112 serve the dual purpose of providing an electrical connection to the array, and providing substrate anchors for the suspended structures. These lines must be wide enough to ensure that they remain attached to the substrate throughout the processing steps, and thus may be on the order of 20 $\mu$m in width. These anchors provide mechanical rigidity to the structure.

Maintenance of the planarity and structural rigidity of the narrow beams which make up the address lines becomes important as the array size increases. For example, the line width and the gap between the address lines may be 1.5 $\mu$m and 1 $\mu$m, respectively. These address lines are released from the substrate during the SCREAM fabrication process. For larger arrays, wider address lines must be used consistent with maintaining the desired mirror fill factor. With careful alignment, a fill factor approaching 90% may be provided.

Figure 11:
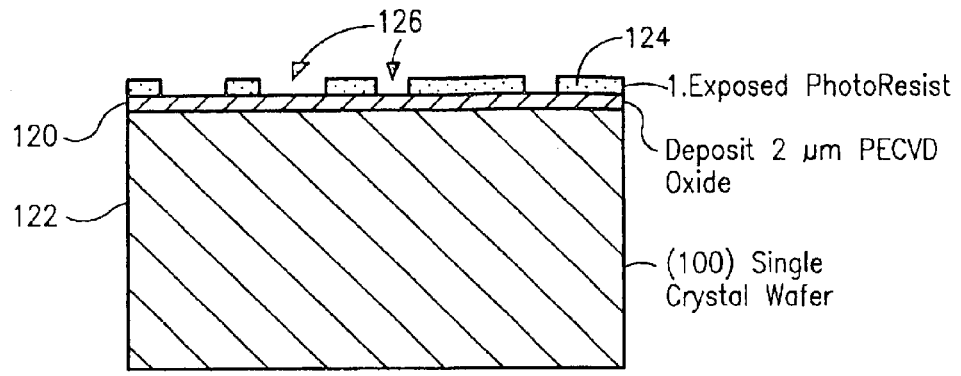
FIGS. 11–17 provide a diagrammatic illustration of the steps of a process for fabricating a two-depth, large motion MEMS actuator assembly in single crystal silicon.
Figure 12:
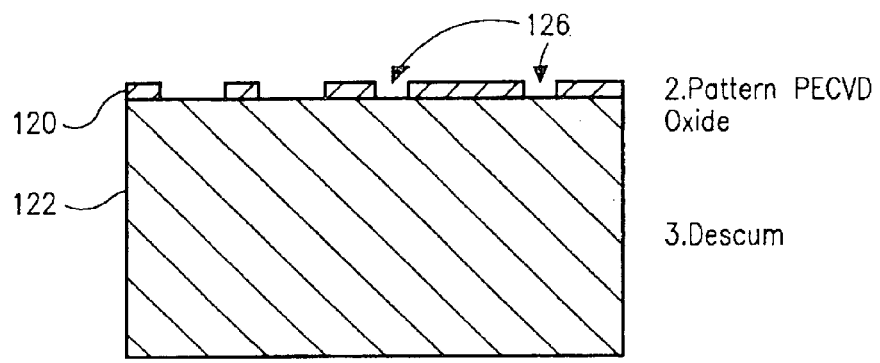

A process for producing two-depth, large motion actuators is illustrated in FIGS. 11–17, to which reference is now made. This process is based on the SCREAM single mask photolithography process utilizing a standard silicon wafer. While the process is designed to produce 100 $\mu$m deep fingers and 22 $\mu$m deep springs, the process flow makes clear how the heights of the springs and of the fingers can be scaled by choosing the appropriate etching steps. As illustrated in FIG. 11, a 2 $\mu$m thick PECVD oxide layer 120 is deposited on a [100] P-type polished silicon wafer 122. This oxide thickness is required, since a typical selectivity of silicon to oxide in DRIE etching is 100 to 1. An additional 1 $\mu$m of oxide is usually added to protect silicon structures during the isotropic silicon etch for releasing portions of the structure, and during the required over-etch of the mask oxide during the floor oxide clearance steps to be described. A resist layer 124 is spun onto the top surface of the oxide layer 120 and is photolithographically exposed in known manner to produce a pattern generally indicated at 126. Thereafter, the wafers are descummed, using an oxygen barrel asher, to completely clear the resist from the exposed area. The pattern in the photoresist layer is then transferred to the oxide film 120 using a CHF$_3$ plasma in a magnetron reactive ion etcher, illustrated in FIG. 12.

Figure 13:
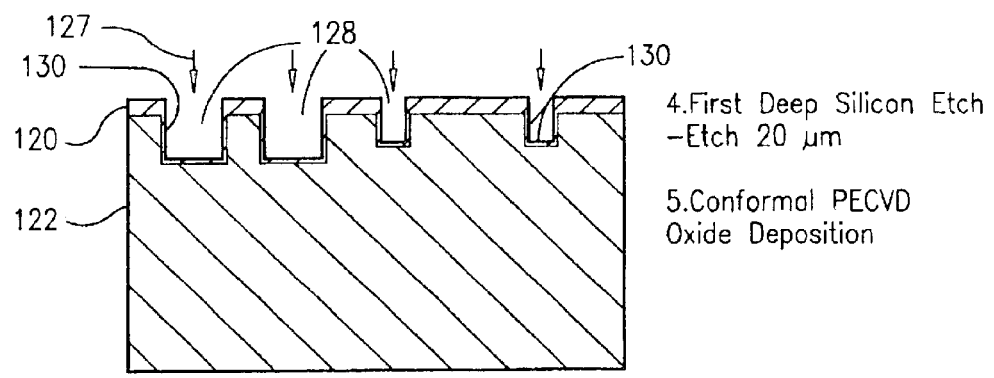
Figure 14:
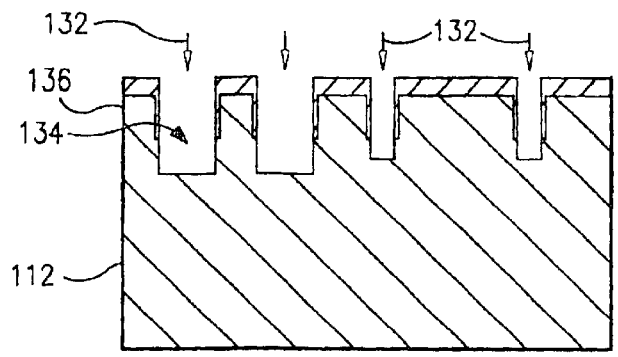
Figure 15:
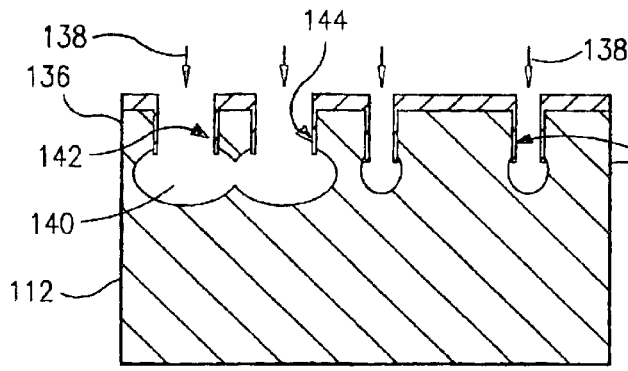

A first deep silicon etch, indicated by arrows 127, through the pattern 126 is performed to produce etched trenches 128, illustrated in FIG. 13. This step defines the depth of spring structures such as the torsion bars 30 and 70. The patterned silicon structure is then conformally passivated with a PECVD oxide layer 130.

After clearing the oxide from the floors of the trenches 128 using a CHF$_3$ plasma etch, a second deep silicon etch is carried out, as illustrated by arrows 132, to increase the depth of the trenches 128 by, for example, an additional 30$\mu$ below the sidewall oxide 130, as indicated at 134, making the total height of the silicon structures 136 located under the mask 120 approximately 50 $\mu$m. A time-controlled SF$_6$ plasma, indicated by arrows 138 in FIG. 15, etches the silicon wafer under the protective oxide layer 130. This produces cavities 140 which undercut the silicon structures 136 to selectively release those structures having silicon cores which are sufficiently thin to be completely undercut and released. Thus, for example, beam 142, which may be a spring structure with a core width of about 2 $\mu$m, is released, whereas structures having a width of, for example, 4$\mu$ will not be undercut sufficiently to be released, as illustrated by structures 144, 146 and 148. In the illustrated embodiment, the released spring may have a core with a height of approximately 22 $\mu$m, giving it a high aspect ratio with a height of 22 $\mu$m and a width of 2 $\mu$m.

Figure 16:
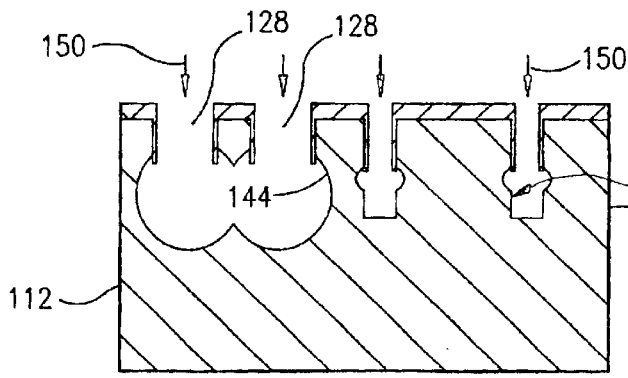
Figure 17:
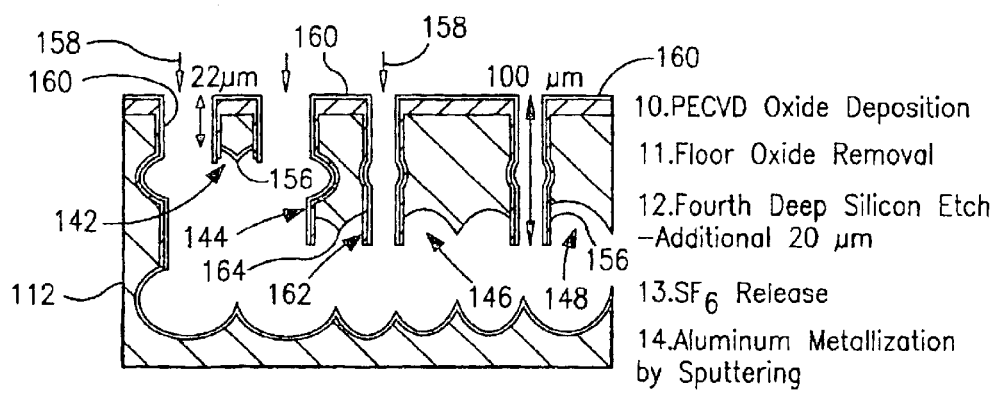

After this first release, a third silicon etch step, indicated by arrows 150 in FIG. 16, increases the depth of the trenches 128 by, for example, an additional 50 $\mu$m to make the structures 144, 146 and 148 approximately 100 $\mu$m in height. These structures may form the fingers and backbone of the actuator structure for the micromirror assembly, for example. In order to release the movable fingers and the backbone, another conformal thin layer of PECVD oxide 156 is deposited and the floor oxide is removed, using an anisotropic CHF$_3$ oxide etch (FIG. 17). A slightly longer overetch is done in comparison to the first floor oxide etch because the aspect ratio of the fingers is higher, due to the deeper silicon etching. The etch species has a more difficult time getting into small areas, so the etch takes longer to remove these products.

After the floor oxide etch, a 30 $\mu$m silicon extension etch, indicated by arrows 158, is performed to release the remaining silicon structures, using anisotropic SF$_6$ etch. This final release step does not reduce the height of the silicon structures that have already been released, because the prior PECVD oxide deposition is conformal enough to deposit the oxide underneath the structure 142, for example, to protect it from further etching, as illustrated in FIG. 17. Following the release of the structures 144, 146 and 148 by the SF$_6$ etch, an aluminum layer 160 is conformally sputtered over the surfaces of the released structures and the adjacent substrate 112 for metallization. It is noted that the released structures illustrated in FIG. 17 include a PECVD oxide overhang, shown for example at 162, which isolates the metal layer 160 from the silicon core 164 of the released structures.

As illustrated in FIG. 17, the depth (or height) of the finger structures 144, 146 and 148 can be varied by adjusting the width of the respective structures in the masking step. For example, finger structure 144 is narrower than structures 146 and 148, and thus was undercut by the etching process more quickly than the wider structures, resulting in a shorter structure. Thus, the relative heights of adjacent actuator components such as beams, springs, and fingers is controlled, in the illustrated process, by selection of their respective widths. These components have a silicon core, and are covered by a silicon oxide layer which is electrically insulating so that the fingers can be metallized to form electrodes.

An alternate, preferred process for fabricating the actuator structure for the micromirror assemblies in accordance with the embodiments of FIGS. 1–6 and 7–9 is illustrated in FIGS. 18–28, to which reference is now made. In both the above-described process and the present process, the actuator structure is fabricated on a top surface of a wafer after the micromirror platform structure has been fabricated on the bottom surface thereof. Accordingly, the steps for fabricating the mirror platform are first described.

Figure 18:
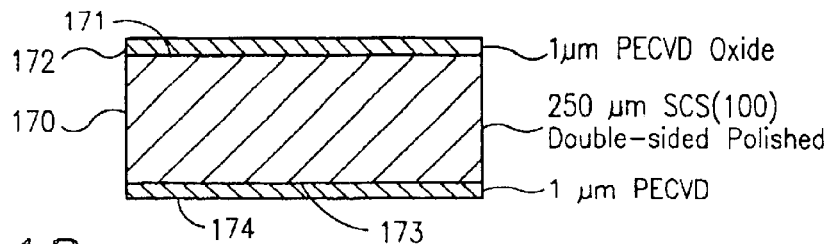
FIGS. 18–28 illustrate diagrammatically the steps for fabricating a micromirror structure utilizing an alternate procedure for obtaining two-depth electrodes.
Figure 19:
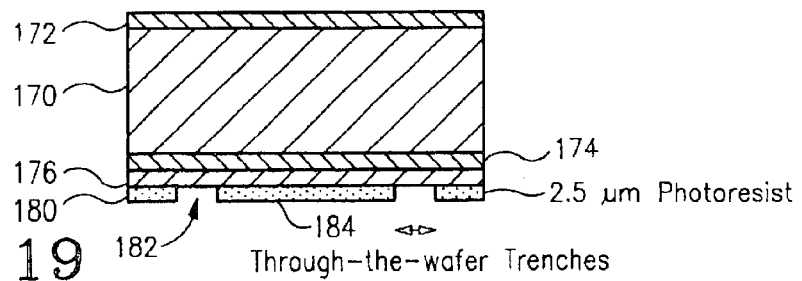
Figure 20:
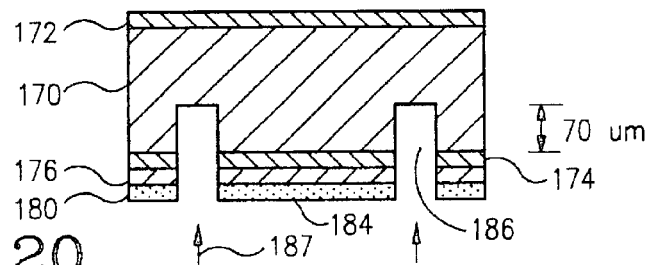

As illustrated in FIG. 18, a polished single crystal silicon wafer 170, is used as a starting material. The wafer may be 180–250 $\mu$m thick, but in the illustrated embodiment it is a 250 $\mu$m thick [100] wafer, and preferably is polished on both sides. 1 $\mu$m thick electrically insulating PECVD oxide layers 172 and 174 are formed on both the top and bottom surfaces of wafer 170; thereafter, in one form of the invention, a metal film 176, which may be a 0.5 μm thick layer of aluminum, for example, is sputtered on the mirror side of the wafer, in this case on the bottom oxide layer 174. A photoresist layer 180 is then spun onto the surface of aluminum film 176 and is patterned, at 182, to define a micromirror surface 184 and surrounding trenches 186, using standard photolithography. The pattern 182 is transferred to the aluminum layer 176 by a $Cl_2$ plasma etcher and thereafter the oxide layer 176 is selectively etched using $CHF_3$ plasma. During this processing, the surface of the front of the wafer is protected by the oxide layer 172.

The oxide etch of layer 174 exposes the silicon substrate 170 through the trenches 182 around the mask segment 184 which defines the location and shape of micromirror platform which includes the mirror surface. The exposed silicon is etched (arrows 187) to a depth of about 70 μm, as illustrated at 186 in FIG. 20. These trenches may, for example, be 19 μm wide. Although the fabrication of only a single micromirror is illustrated, it will be understood that an array of these structures may be fabricated in the bottom surface of the wafer, with adjacent mirrors being separated by trenches 186 and the spacing for metal lines. Following fabrication of the trenches 186, the resist layer 180 is removed and the wafer is descummed.

Thereafter, the top surface oxide layer 172 is stripped, using a $CHF_3$ plasma etch. After a thorough surface cleaning, a new PECVD oxide layer 190 (FIG. 21) is deposited on the front surface 171 of wafer 170. This is done to insure that the mask oxide for front surface processing is free of scratches or defects. A resist layer 192 is then spun onto the layer 190 and a first top surface photolithographic mask is positioned on the photoresist layer 192 and is carefully aligned to the back side mirror structure 184 using a conventional infrared aligner such as an infrared aligner. At this point in the process, the actuator fabrication steps described above with respect to FIGS. 11–17 may be carried out.

Figure 21:
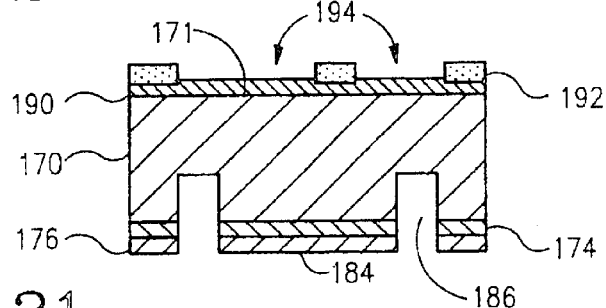
Figure 22:
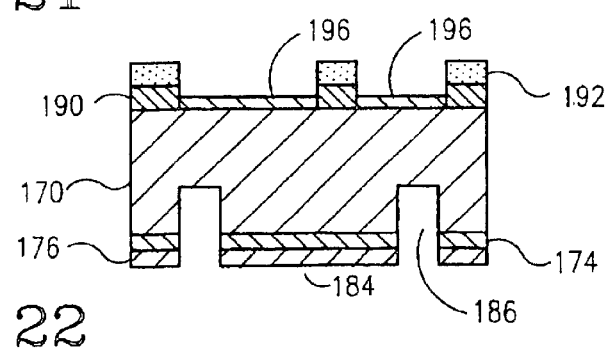
Figure 23:
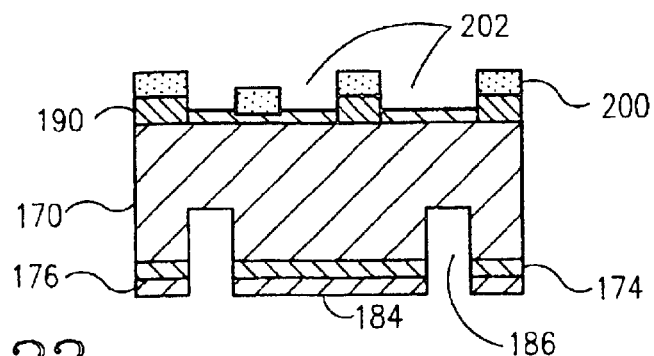
Figure 24:
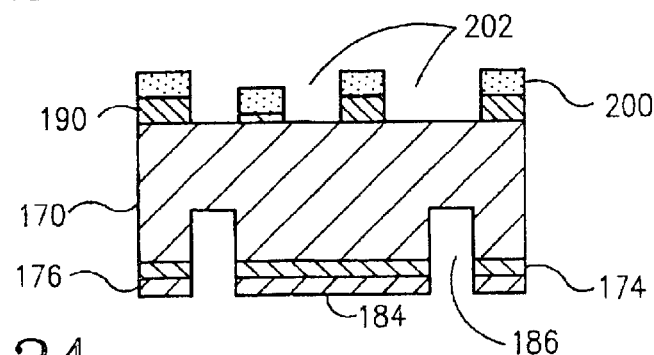

In the preferred, alternative process, a pattern 194 which defines the area where the fixed fingers of the micromirror actuator are to be located is then exposed, as indicated at 194 in FIG. 21. This pattern is then transferred to the oxide layer 190 using a $CHF_3$ plasma to selectively etch the area where the fixed fingers of the actuator structure will be located. In this step the oxide layer 190 is etched to a depth of 0.30 μm, and this depth becomes the height difference between the fixed and movable electrodes after metallization in the SCREAM fabrication process used to form the fingers. This reduced thickness portion of oxide layer 190 may be in the form of one or more trenches in layer 190, as illustrated at 196 in FIG. 22. The resist layer 192 is then removed, the wafer is descummed, and a second resist layer 200 is applied to the top surface of oxide layer 190 (FIG. 23). The resist layer 200 is exposed, as indicated at 202, using a second top surface mask to define the entire actuator structure, with the pattern 202 being aligned with the oxide trenches 196. In one example of this structure, the width of the silicon cores of the actuator comb fingers was selected to be 2 μm, with the effective finger length being 75 μm. Either the fixed or the movable actuator fingers may be patterned within the oxide trenches 196, while the other fingers are patterned on the oxide layer outside trenches 196. Thereafter the pattern 202 is transferred into the oxide layer 190, as illustrated in FIG. 24.

Figure 25:
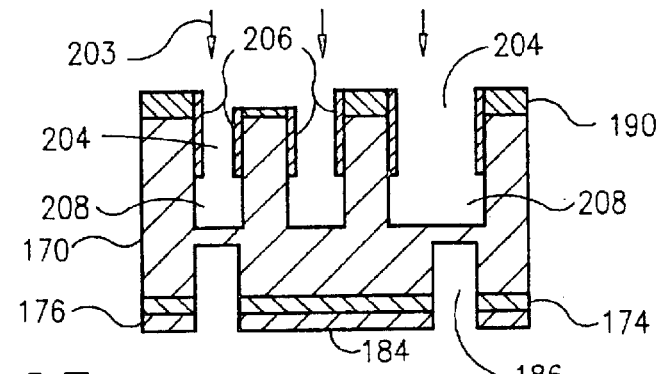
Figure 26:
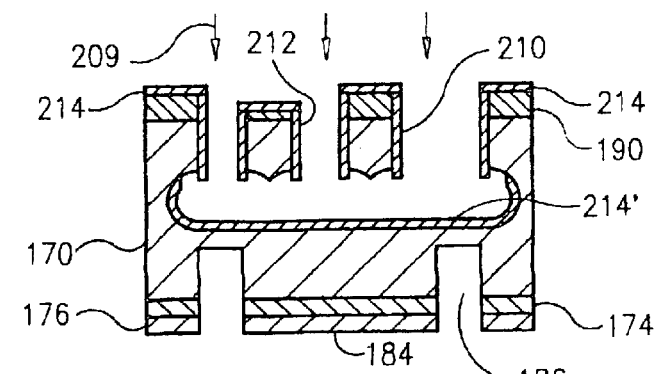

A 20 μm deep silicon etch (arrow 203) is performed through the oxide pattern 202 into the underlying silicon substrate 170 to produce trenches 204, the resist layer 200 is removed, and the wafer is descummed. (See FIG. 25) Thereafter, an electrically insulating 0.2 μm thick layer of PECVD oxide 206 is conformally deposited in the trenches 204 and the oxide is removed from the floors of the trenches, using a $CHF_3$ plasma. The sidewalls of the trenches remain covered by the oxide layer, as illustrated in FIG. 25. Thereafter, an extension etch, 35 μm deep, for example, is performed to deepen the trenches 204 as illustrated at 208 in FIG. 25 to facilitate the release of movable structures. This is followed by a release etch (arrows 209 in FIG. 26) using $SF_6$ plasma to release actuator fingers such as the fingers 210 and 212. The etch is timed so that only the desired structures are released; the posts which connect the actuator to the mirror platform as well as any required substrate anchors are not released, but are sufficiently thick to avoid being completely undercut. Following the release of the actuator components, a thin layer of PECVD oxide is deposited, as illustrated at 214, to provide a layer 214' at the bottoms of the trenches 204 and in cavities 208 which will serve as an etch stop for the through-the-wafer etch which is to follow.

Figure 27:
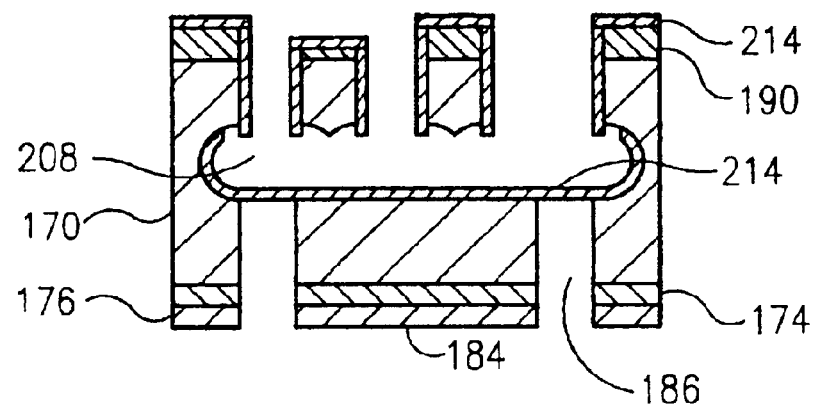
Figure 28:
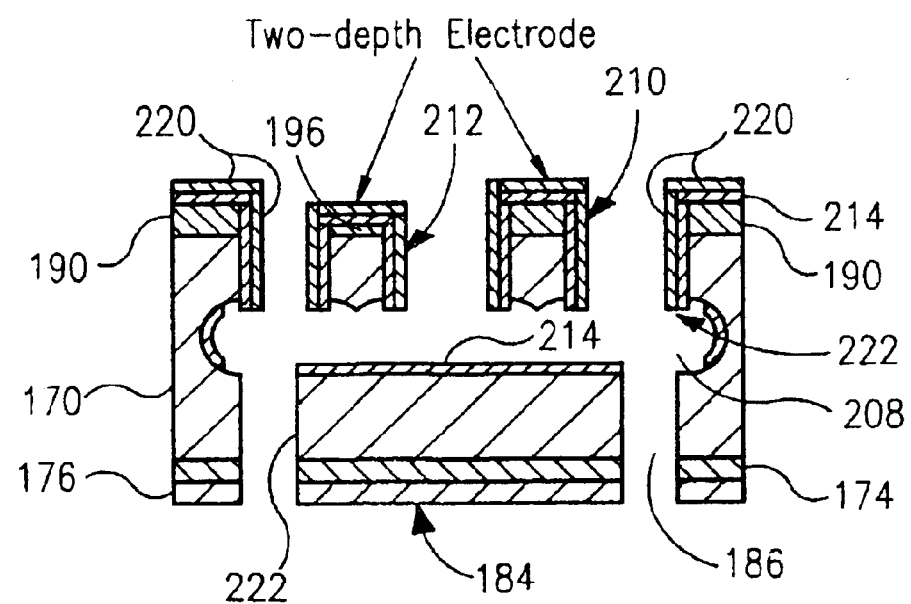

In order to release the micromirror platform for motion with respect to the substrate following fabrication of the actuator structure using either of the foregoing processes, the wafer is then etched from the back side, as illustrated in FIG. 27, to extend the depth of trench 186 to the oxide etch stop layer 214'. After the exposed silicon in the bottom of trench 186 is completely etched away, the etch stop layer is removed, as illustrated in FIG. 28, using a $CHF_3$ plasma, and the micromirror assembly is free to move pivotally or vertically with respect to the substrate, depending on the actuator configuration. It is noted that the dimensions of the actuator structure remain unchanged during the through-the-wafer etch.

Thereafter, a 0.3 μm thick aluminum layer is sputtered on the actuator structure, as illustrated at 220 in FIG. 28. Electrical isolation is provided by the oxide layer 214, with the overhang 222 below the released structures preventing the aluminum from contacting the underlying silicon in the undercut regions of cavity 208. A height difference between fingers 210 and 212 is produced, in the preferred process, by the selective oxide etch region at 196, described above, which produces a different oxide thickness than occurs in the remainder of layer 190. When the fingers are metallized, electrodes of differing heights are produced as illustrated in FIG. 28 at 210 and 212. As noted above, either the fixed or the movable electrodes may have the greater height.

In tests, structures fabricated in accordance with the foregoing processes were found to produce uniform vertical motion across the mirror platform utilizing either the z-motion structure of FIGS. 7–9 or the pivotal motion structure of FIGS. 1–4. In both cases, the motion is driven by the two-height comb finger configuration illustrated herein with a mirror surface that was measured to be optically flat and smooth.

The two-sided wafer processing described above has the advantage of permitting fabrication of a mirror surface at the beginning of the process, and protecting that surface from damage during the later etching steps used to fabricate and release the platform and actuator assembly. Although the process is described in terms of providing a metal reflective surface on the mirror platform, and protecting that surface with a mask layer during later processing, it will be understood that this is exemplary, and that other mirror surfaces may be provided on the platform. For example, an active quantum well structure such as thin film layers of materials such as GaAs, GaInP, GaN, and the like may be grown on the polished wafer, prior to fabrication of the micromirror assembly, with this surface being protected by suitable masks during the etching processes described above. Similarly, the wafer surface can be lithographically grooved to provide optical gratings before the assembly is fabricated.

Although the invention has been described in terms of preferred embodiments, it will be apparent that numerous modifications may be made without departing from the true spirit and scope thereof, as set forth in the following claims:

What is claimed is:

1. A method for fabrication of a movable micromirror, comprising:
   coating top and bottom parallel surfaces of a wafer with an electrically insulating layer;
   coating at least a portion of said bottom surface with a reflective surface;
   forming in said bottom surface a trench surrounding a mirror platform including said reflective surface;
   forming in said top surface an actuator structure having a movable portion connected to said mirror structure;
   releasing said mirror platform from said wafer for motion with said actuator; and
   wherein forming said actuator includes fabricating multiple movable stationary interdigitated fingers having different effective heights for producing relative vertical motion of said movable and stationary fingers.

2. The method of claim 1, wherein fabricating fingers having different effective heights includes fabricating said movable and stationary fingers with different core heights.

3. The method of claim 1, wherein fabricating fingers having different effective heights includes fabricating said movable and stationary fingers with the same core heights and with top surface oxide layers of different thicknesses.

4. The method of claim 1, wherein forming said actuator includes fabricating movable and stationary interdigitated fingers having silicon cores with the same height, coating the tops of the cores of said movable and stationary fingers with different thicknesses of an insulating layer; and metallizing said fingers to produce interdigitated electrodes having different effective heights.

5. The method of claim 1, wherein forming said actuator includes fabricating movable and stationary interdigitated fingers having silicon cores of differing heights; coating said fingers with an electrically insulating layer; and metallizing said fingers to produce interdigitated electrodes having different effective heights.

* * * * *